Nov. 3, 1953
G. B. HILL
2,657,519
ROTARY WHEEL SIDE DELIVERY RAKE
Filed Dec. 1, 1950
2 Sheets-Sheet 1
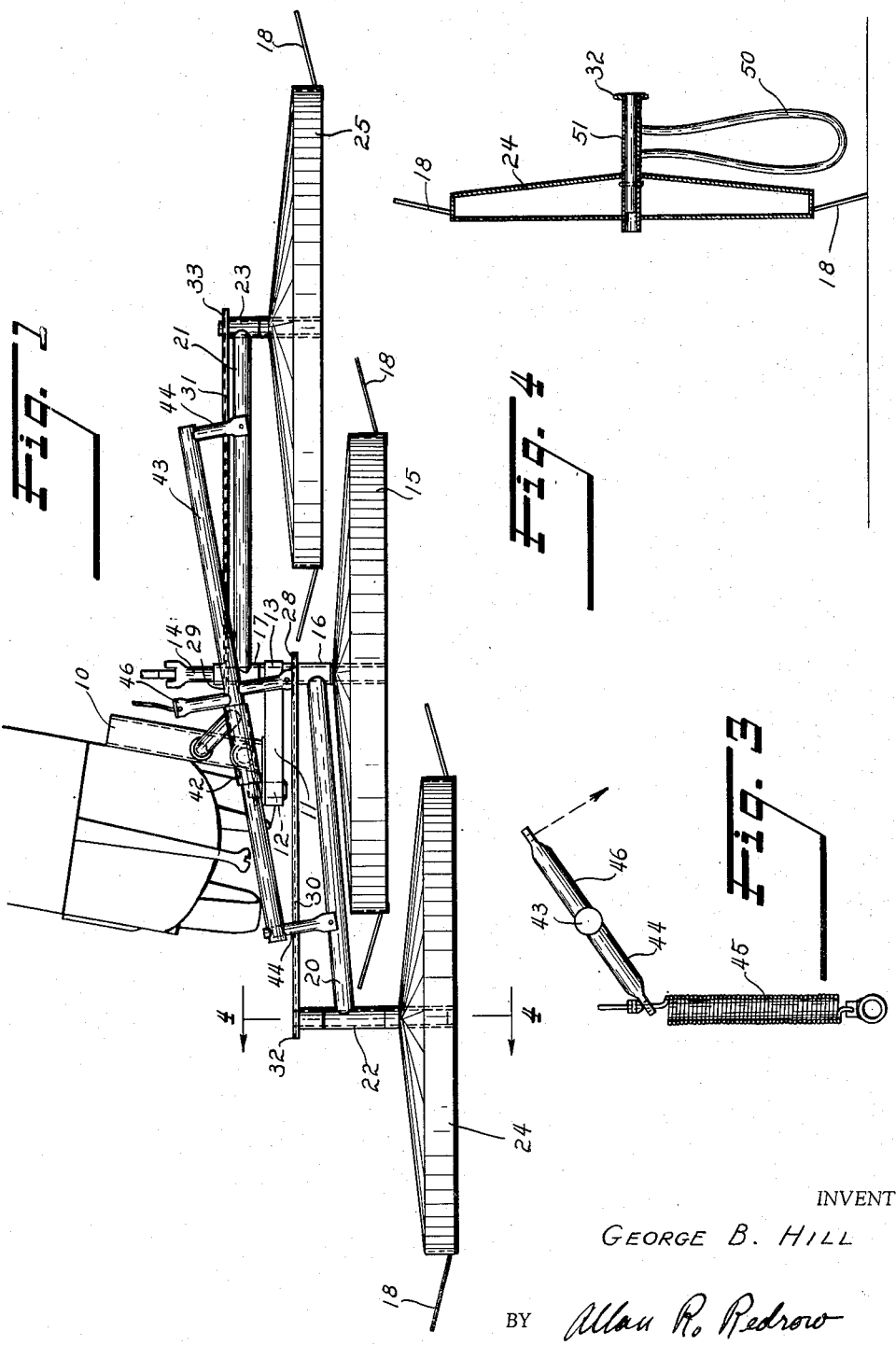
INVENTOR
GEORGE B. HILL
BY Allan R. Redrow
ATTORNEY

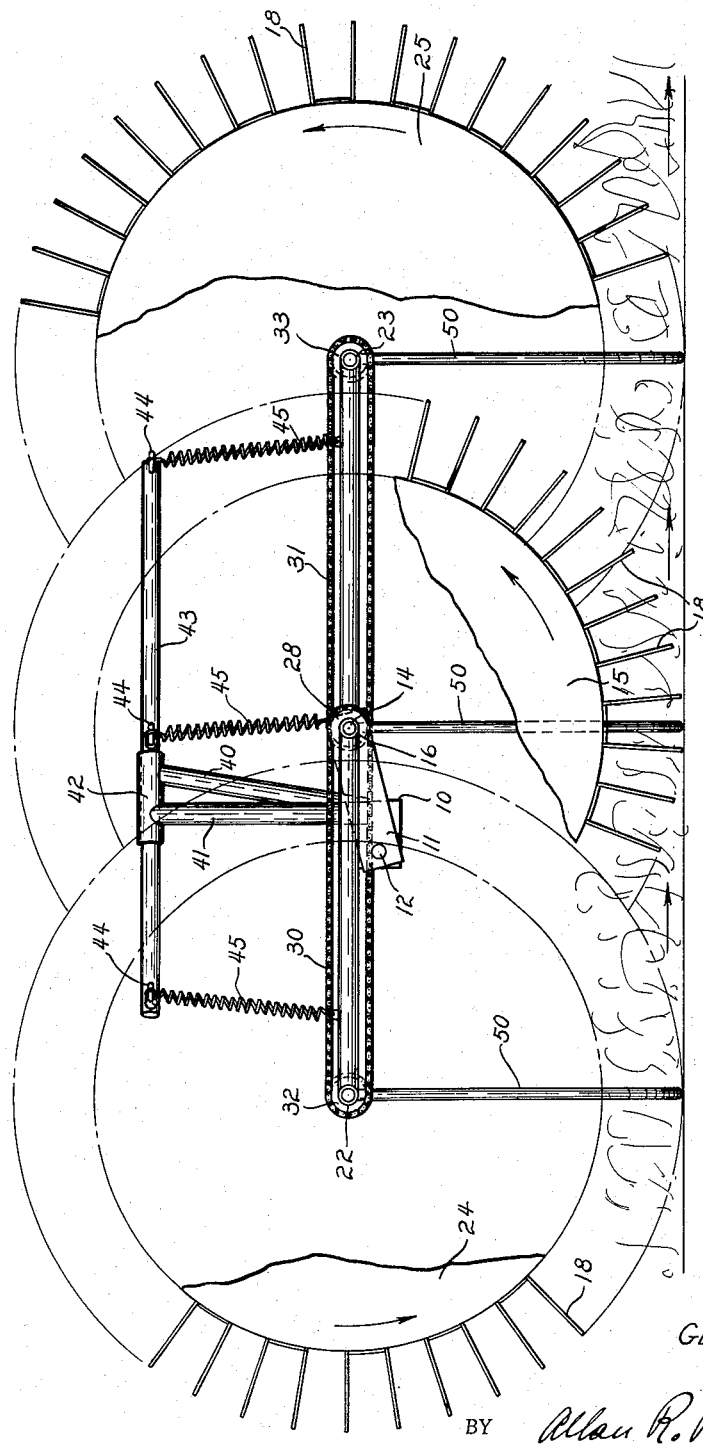

Patented Nov. 3, 1953

2,657,519

UNITED STATES PATENT OFFICE 2,657,519

ROTARY WHEEL SIDE DELIVERY RAKE

George B. Hill, New Holland, Pa., assignor to The New Holland Machine Division of the Sperry Corporation, New Holland, Pa., a corporation of Delaware Application December 1, 1950, Serial No. 198,515

7 Claims. (Cl. 56—377)

This invention relates to rakes and more particularly to the art of side delivery rakes.

It is concerned with the type of side delivery rake wherein a series of rotating wheels mounted generally in an echelon relation are driven broadside into a crop to be raked and it is an improvement on known rakes such as the one shown in the patent issued to Beck 468,382 on February 9, 1892. The present invention provides a novel structure for mounting the series of raking wheels whereby they may be driven to rotate and includes in the preferred form, a frame design adapted to mount the rake on a tractor. This invention also makes use of a simplified drive system for rotating the wheels.

As shown in the drawings:

Figure 1 is a top plan view of the rake, shown mounted on the front end of a tractor;

Figure 2 is a front elevation of the machine shown in Figure 1, partly broken away;

Figure 3 is an end view of the linkage system used for raising the raking wheels; and Figure 4 is a side view of a feeler means which may be associated with each of the raking wheels.

The wheels forming the raking means of the invention are mounted in a suitable frame and it will be obvious that the frame can be either, a self supported wheeled frame, or a two wheeled frame with a third support on a tractor at the front end or at the rear draw bar thereof, or the frame can be designed to be supported entirely by the tractor by being mounted in its front end so that the driver can watch the rake as it is driven through the field.

The preferred form of the tractor mounted frame structure is best shown in Figure 1 wherein a relatively heavy beam member 10 is mounted on the front end of the tractor frame at one side of the motor so that it may be easily moved from or mounted in place. The front end of the beam 10 carries a generally vertically disposed bearing plate and a pivotally mounted arm 11 that is adapted to carry the raking structure so that it may be raised or lowered with respect to the ground, is mounted to oscillate over the surface of the bearing plate. This carrying arm 11 oscillates about a bearing 12 that is fixed to the beam 10 and the arm has a large flat area that rides against the bearing plate so that it can buck up against the beam 10 and be supported in the vertical plane of the plate as the rake wheels push backwardly against the arm 11 during normal usage. The arm 11 has a bearing 13 at its outer end which supports an axle 14 that serves as the main drive for the machine. Axle 14 is driven from the power take-off of the machine of the tractor by any suitable drive connection.

The axle 14 that is rotatably mounted at the outer end of the carrying arm 11 also supports a raking wheel 15 at its front end and bearings 16 and 17 are carried on axle 14 behind wheel 15, for a purpose that will appear more fully below. Axle 14 is keyed to the hub of wheel 15 and it rotates in the direction of the arrow as shown in Figure 2. Raking wheel 15 is the center wheel of the three wheels mounted in echelon relation and is moved up and down with the outer end of arm 11. The wheel 15 has a relatively large diameter and is provided around its periphery with a series of resilient raking teeth 18 which lift the crop up from the ground and deliver on to the next wheel in the series of raking wheels.

The bearings 16 and 17 support secondary bearing arms 20 and 21 respectively which carry bearings 22 and 23 at their outer ends for rotatably mounting the other two raking wheels 24 and 25. Each of these wheels has approximately the same diameter as the center wheel 15 and they also carry resilient raking teeth 18 fixed to their peripheries.

Each of the raking wheels 24 and 25 is driven from the axle 14 and for this purpose a pair of sprocket wheels 28 and 29 are keyed to the axle 14 for cooperation with a pair of sprocket chains 30 and 31. The chains 30 and 31 are trained over corresponding sprockets 32 and 33 keyed to the axles of 24 and 25 so that the wheels are driven to rotate in the direction of the arrows as shown in Figure 2.

The several wheels are all mounted at the ends of arms that may oscillate about generally horizontal axes and all of the wheels may be lifted or lowered simultaneously by a suitable linkage mechanism for proper adjustment with respect to the ground during normal raking operations. Obviously they may be lifted well off of the ground for transport purposes when driving the rake to and from the area to be worked upon. This lifting linkage mechanism includes a suitable leverage system and resilient hangers connected to the carrying arms adjacent the bearing supports for the wheels whereby a cable or operating link may be carried back to a position near the driver's seat on the tractor so that all of the rake wheels 15, 24, and 25 can be quickly lifted or lowered as need be.

The lifting mechanism is best shown in Figures 2 and 3, where it is shown as being supported above the several lever arms that carry the raking wheels. For this purpose, a support stand including the uprights 40 and 41 is carried on the beam 10 and the uprights support a horizontally disposed bearing 42 at their upper ends in which the rocking bar 43 is carried. The bar 43 has suitable forwardly and downwardly projecting arms 44 fixed thereto, each of the arms 44 being connected respectively at their free ends to one of the arms 11, 20, and 21 through the support springs 45. The springs 45 have sufficient tension to support the arms and their corresponding raking wheels during normal operation of the rake.

The oscillating rocking shaft 43 also has a generally upwardly and rearwardly extending arm 46 fixed thereto which is connected to the link or cable system that runs back to the driver so that the rake may be lifted or lowered as desired. When the arm 46 is moved in the direction of the arrow as shown in Figure 3, the arms 44 are raised and springs 45 lift the rake wheels from the ground. When the arm 46 is moved in the opposite direction, the wheels fall toward the ground until they are restrained by the springs 45.

In normal operation, the rake may be driven through the field and the raking wheels 15, 24, and 25 may be lowered by the raising of the lever 46 so that the arms 11, 20, and 21 may be lowered to bring the wheels into close proximity to the ground. When the rake teeth 18 are adjusted toward the ground so that they are spaced an inch or two from the surface of the soil, the drive connection through the drive shaft 14 may be coupled to the power-take-off of the tractor and the raking wheels 15, 24, and 25 are thus driven to rotate so that the teeth 18 carry sidewise, any grass or other crop disposed in their path, as the wheels are driven broadside through the field. Referring to Figure 2, it is seen that the crop is delivered from the end wheel 24 to the center wheel 15 and from that wheel on to the third wheel 25 in the series from where it is deposited on the ground to form a windrow.

As the rake is moved through the field, the wheels are moved generally broadside into the cut crop so that all of the material is delivered from in front of the rake from wheel to wheel until it passes from in front of the end wheel of the series. The wheels are driven at a proper speed to effect the delivery of the crop, by centrifugal action, off of the end of the teeth 18 and the raked crop readily passes from wheel to wheel as the rake is driven along. The speed of rotation of the raking wheels may be varied as desired but is dependent primarily upon the density of the crop being raked and thus when there is a larger volume of hay or the like in the field, the wheels may be rotated faster to pass the material more quickly across the face of the rake. When the crop is lighter, however, the wheels may be slowed down and the hay may be delivered from one end of the rake to the other with the least possibility of damage to the delicate leaves which provide the more nutritious food ingredients of the hay crop.

The use of a rake of this kind having rotating wheels arranged in echelon, provides a simple means for raking a field of cut and cured hay and since the raking teeth 18 are nearly always maintained above the surface of the soil, the hay can be raked cleanly without stirring up any dirt or pebbles which might otherwise become mixed in with the hay to detract from its value as a food crop for cattle. In order to insure that the raking teeth 18 of the wheels will never dig too deeply into the ground whereby to eliminate the possibility of an undue lifting of soil or rocks, a suitable feeler arrangement 50 may be provided as shown in Figure 4. The feelers 50 preferably each take the form of a loop of rigid material such as a pipe bent to the shape shown, and an individual feeler is fixed to each of the bearings 16, 22, and 23 which support the several raking wheels. The loops 50 extend downwardly from these bearings so as to contact the soil when the wheels are dropped suddenly or when a ridge is encountered and when the feelers drop against the ground they function to hold the wheels above the surface of the soil. The loops 50 are normally spaced a bit above the soil, however, whenever a bump, rock or ridge is encountered, the particular wheel associated with that feeler is lifted so that by the time the wheel falls down again against its spring, the obstacle will have been passed and there is little possibility that any dirt or rocks will be stirred up and carried over with the hay material being raked.

Under conditions such as those discussed above where there may be a heavy or light crop, it is sometimes desirable to change the angularity of the rake wheels with respect to the normal direction of movement of the tractor through the field. Although no means for adjusting this angularity has been shown in the drawings, it is apparent that suitable provision could be made for mounting frame 10 at any desired angle with respect to the tractor chassis to accomplish this purpose. It is apparent that many modifications such as this may occur to those skilled in the art which will fall within the scope of the following claims.

I claim:

1. A side delivery rake comprising a frame and means supporting same for ground traversing movement, a plurality of raking wheels disposed in echelon formation for rotation in substantially vertical planes, vertically movable suspension means supporting said respective wheels from said frame for relatively independent vertical movement, and lifting mechanism carried by said frame for simultaneously vertically adjusting said suspension means and raking wheels, including a rigid movable element, and resilient means connecting said element to each of said suspension means to provide a floating suspension for the respective raking wheels.

2. A tractor mounted side delivery rake having a series of cooperating rotating wheels provided with raking teeth around their respective peripheries, said wheels being mounted for rotation in perpendicular planes transverse to the movement of the tractor, comprising a beam removably mounted on the front end of the tractor, an arm mounted on said beam for swinging movement in a transverse plane relative to the tractor movement, one of said series of raking wheels being rotatably mounted on the free end of said arm, other support arms being mounted on said first arm for swinging movement about the rotational axis of said last mentioned wheel, other wheels of said series being rotatably supported at the free ends of said other arms, resilient suspension means for supporting said arms, and means coacting with said suspension means to simultaneously adjust the positions of all of said arms with respect to the ground.

3. A tractor mounted side delivery rake comprising a rigid frame fixed on the tractor, a rigid arm swingable on said frame in a plane transverse to the movement of the tractor, a drive shaft carried adjacent the free end of said arm for movement therewith and for rotation about an axis substantially aligned with the tractor movement, flexible transmission means connecting said drive shaft to a power take-off on the tractor, a secondary arm swingable about said drive shaft, a raking wheel rotatably carried by said secondary arm for adjustment about the axis of said drive shaft, and a flexible drive transmitting rotation from said drive shaft to said wheel in all positions of said wheel.

4. The combination of claim 3 including a rake wheel fixed on said drive shaft for rotation therewith, and lifting mechanism resiliently connected to both of said arms to simultaneously vertically adjust said arms and wheels.

5. A side delivery hay rake comprising a frame and means supporting same for ground traversing movement, a first rigid arm swingable on said frame in a plane substantially transverse to the said ground traversing movement, a first raking wheel rotatably supported at the free end of said arm, a second rigid arm mounted on said first arm for swinging movement about the rotational axis of said first raking wheel, a second raking wheel carried by said second arm for adjustment about the rotational axis of said first wheel, and flexible drive transmitting means connecting said wheels for simultaneous rotation.

6. The combination of claim 5 including means resiliently supporting the free ends of both said arms.

7. The combination of claim 5 including flexible power transmission means operatively associated with said first wheel.

GEORGE B. HILL.

References Cited in the file of this patent

UNITED STATES PATENTS

| Number | Name | Date |
|---|---|---|
| 468,382 | Beck | Feb. 8, 1892 |
| 2,447,354 | Morrill | July 8, 1946 |
| 2,532,652 | Wray, Sr. | Dec. 5, 1950 |

FOREIGN PATENTS

| Number | Country | Date |
|---|---|---|
| 17,636 | Great Britain | 1900 |
| 304,118 | Germany | Mar. 6, 1918 |